United States Patent [19]

Inoue et al.

[11] Patent Number: 5,203,200
[45] Date of Patent: Apr. 20, 1993

[54] MACHINE FOR TESTING CENTRIFUGAL LOAD OF BEARING

[75] Inventors: Hiroshi Inoue, Chigasaki; Takehiko Hara, Yokohama, both of Japan

[73] Assignee: Nippon Thompson Co., Ltd., Tokyo

[21] Appl. No.: 698,850

[22] Filed: May 13, 1991

[30] Foreign Application Priority Data

May 18, 1990 [JP] Japan .................. 2-128917

[51] Int. Cl.$^5$ .............................................. G01N 3/56
[52] U.S. Cl. ................................................ 73/7
[58] Field of Search ................ 73/7, 9, 10, 118.1, 73/865.9; 384/58, 449

[56] References Cited

U.S. PATENT DOCUMENTS 4,038,863  8/1977  Mellor et al. .................... 73/9
4,672,838  6/1987  Reh ................................ 73/9

FOREIGN PATENT DOCUMENTS 1017964  5/1983  U.S.S.R. ......................... 73/7

Primary Examiner—Robert Raevis
Attorney, Agent, or Firm—Rogers & Killeen

[57] ABSTRACT

A machine for testing a centrifugal load of a bearing including an outer race member, comprising a supporting frame including a sun ring, and a rotational main shaft. Said rotational main shaft includes mounting portions for mounting the bearing to be tested. Said mounting portions includes a mounting shaft for mounting the bearing to be tested and a supporting bracket for supporting said mounting shaft. Said mounting shaft is arranged in said supporting bracket in parallel with the rotational main shaft in such a manner that a part of an outer peripheral surface of said outer race member is projected radially outwardly from said supporting bracket. An inner peripheral surface of said sun ring is used as a track to be rolled with the outer race members of said respective bearings to be tested. The bearings are rotated around the the rotational shaft and around their own axes along the inner peripheral surface of the sun ring.

2 Claims, 3 Drawing Sheets

MACHINE FOR TESTING CENTRIFUGAL LOAD OF BEARING

BACKGROUND OF THE INVENTION

This invention relates to a testing machine adapted to perform an endurance test and the like of bearings to be rotated around a main shaft and rotated around their own axes, such as a needle cage applied between the large end of a connecting rod and a crank pin of an internal combustion engine to be remarkably effected by centrifugal force.

There has been known as a testing machine for conducting a life test or the like of bearings a testing machine for loading a static load or a variable load as described on pages 31 to 39 of an organ "Lubrication" Vol. 7, No. 1 issued by the Japan Lubrication Society (on Jan. 1, 1962).

As schematically shown in FIG. 3, in this conventional testing machine, bearings B to be tested are mounted at both ends of a main rotational shaft A to rotate the bearings B to be rotated integrally with the main rotational shaft A, and loads are applied to the bearings B to be tested through a load frame E by a spring D for applying a load to the bearings B to be tested in a direction of an arrow C. The bearings B to be tested are tested by maintaining the load by the spring D constant or varying the load in a sine curve state.

As apparent from FIG. 3, in the conventional testing machine, the rotational frequency of the bearing B to be tested is always the same as that of the main rotational shaft A, and this testing machine cannot perform an endurance test of bearings in a state that centrifugal force is applied to the bearings, i.e., in a state that the bearings B to be tested are rotated around the main rotational shaft A and also around their own axes simultaneously.

SUMMARY OF THE INVENTION

An object of this invention is to provide a machine for testing an endurance test of bearings to be tested, placed in a using state in combination of rotations around a main rotational shaft and around their own axes under an action of a centrifugal load substantially near actual using conditions.

In order to solve the above-described subject, according to first aspect of this invention as claimed in claim 1, there is provided a machine for testing a centrifugal load of a bearing including an outer race member, comprising a supporting frame including a sun ring, and a rotational main shaft including mounting portions for mounting the bearing to be tested, said mounting portions including a mounting shaft for mounting the bearing to be tested and a supporting bracket for supporting said mounting shaft, said mounting portions being fixedly projected integrally from an outer peripheral portion of said rotational main shaft at an equal interval in a circumferential direction, each of said mounting portions having same structure, said mounting shaft being arranged in said supporting bracket in parallel with the rotational main shaft in such a manner that a part of an outer peripheral surface of said outer race member is projected radially outwardly from said supporting bracket, said sun ring being concentrical with said rotational main shaft and surrounding said mounting portion, an inner peripheral surface of said sun ring being used as a track to be rolled with the outer race members of said respective bearings to be tested, and according to second aspect of this invention, there is provided a machine for testing a centrifugal load of a bearing wherein an outer peripheral surface of said sun ring is formed in a spherical surface, an inner peripheral surface of an outer ring fixed to said supporting frame is formed in a spherical surface having the same radius as that of the outer peripheral surface of said sun ring, and the outer peripheral surface of said sun ring is held by the inner peripheral surface of said outer ring.

In the first aspect of this invention as claimed in claim 1, when the bearings to be tested are mounted to the mounting shafts for mounting the bearings to be tested, the outer race members of the respective bearings to be tested are brought into contact with the inner peripheral surface of the sun ring surrounding the mounting portions. When the rotational main shaft is rotatably driven in this state, the bearings to be tested are rotated around the rotational main shaft at an equal speed to that of the rotational main shaft, and the outer race members of the respective bearings to be tested rotate on the inner peripheral surface of the sun ring as a track.

The bearings to be tested are rotated around the rotational main shaft, and the outer race members of the respective bearings to be tested are simultaneously rotated around their own axes along the inner peripheral surface of the sun ring by centrifugal force generated by the rotation around the rotational main shaft so that the bearings to be tested are brought into pressure contact with the inner peripheral surface of the sun ring.

In the second aspect of this invention as claimed in claim 2, since the inner peripheral surface of the outer ring of the supporting ring for supporting the sun ring and the outer peripheral surface of the sun ring are formed in spherical surfaces having the same radius, the sun ring is always effected a centripetal action, and the outer race members of the respective bearings to be tested are brought into contact with the whole inner peripheral surface of the sun ring without deviation to be rotated.

PREFERRED EMBODIMENTS OF THE INVENTION

Figure 1:
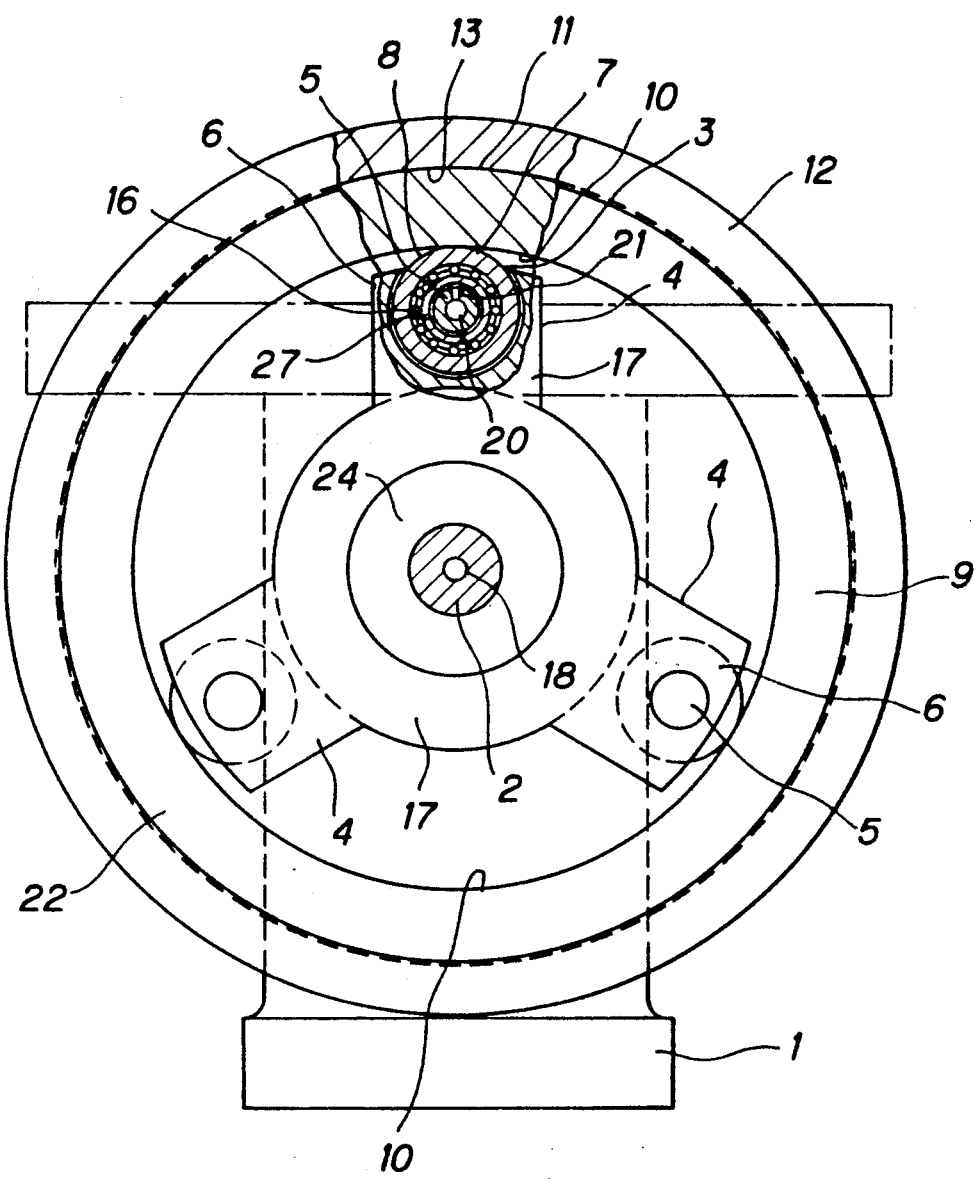
FIG. 1 is a front view showing partly in section an embodiment of this invention.
Figure 2:
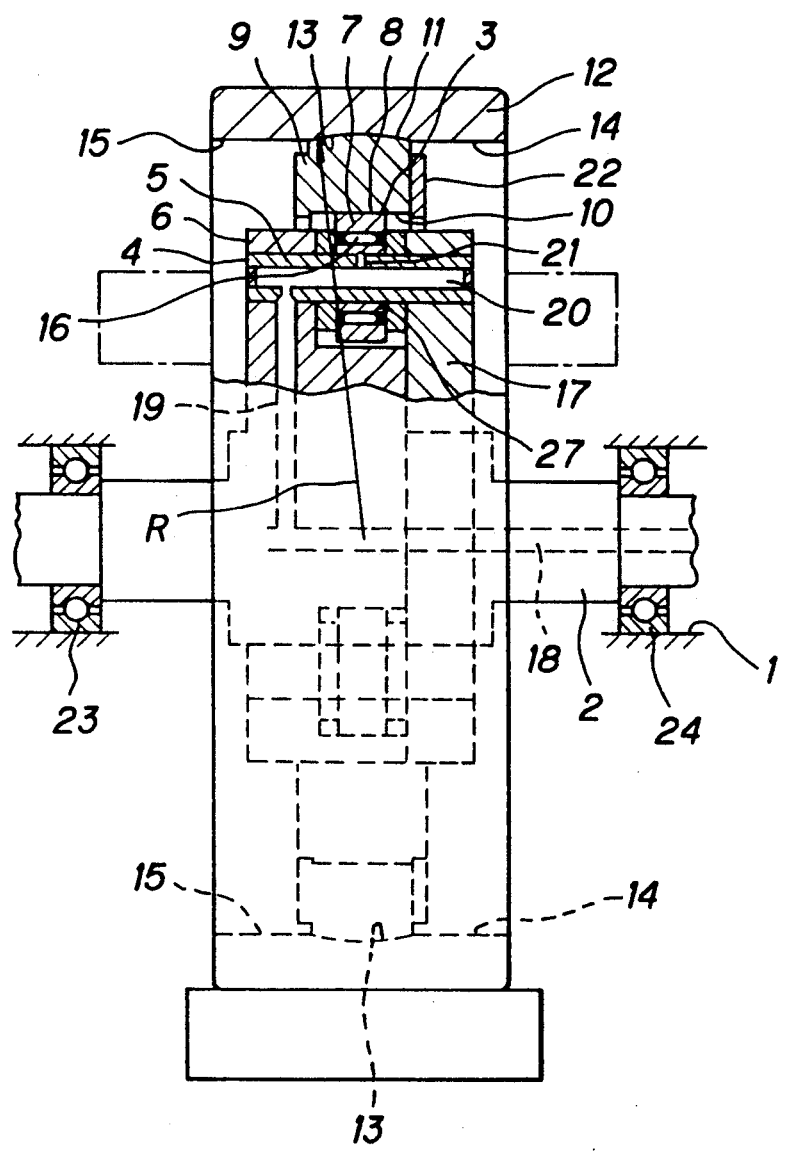
FIG. 2 is a side view showing partly in section the embodiment shown in FIG. 1.
Figure 3:
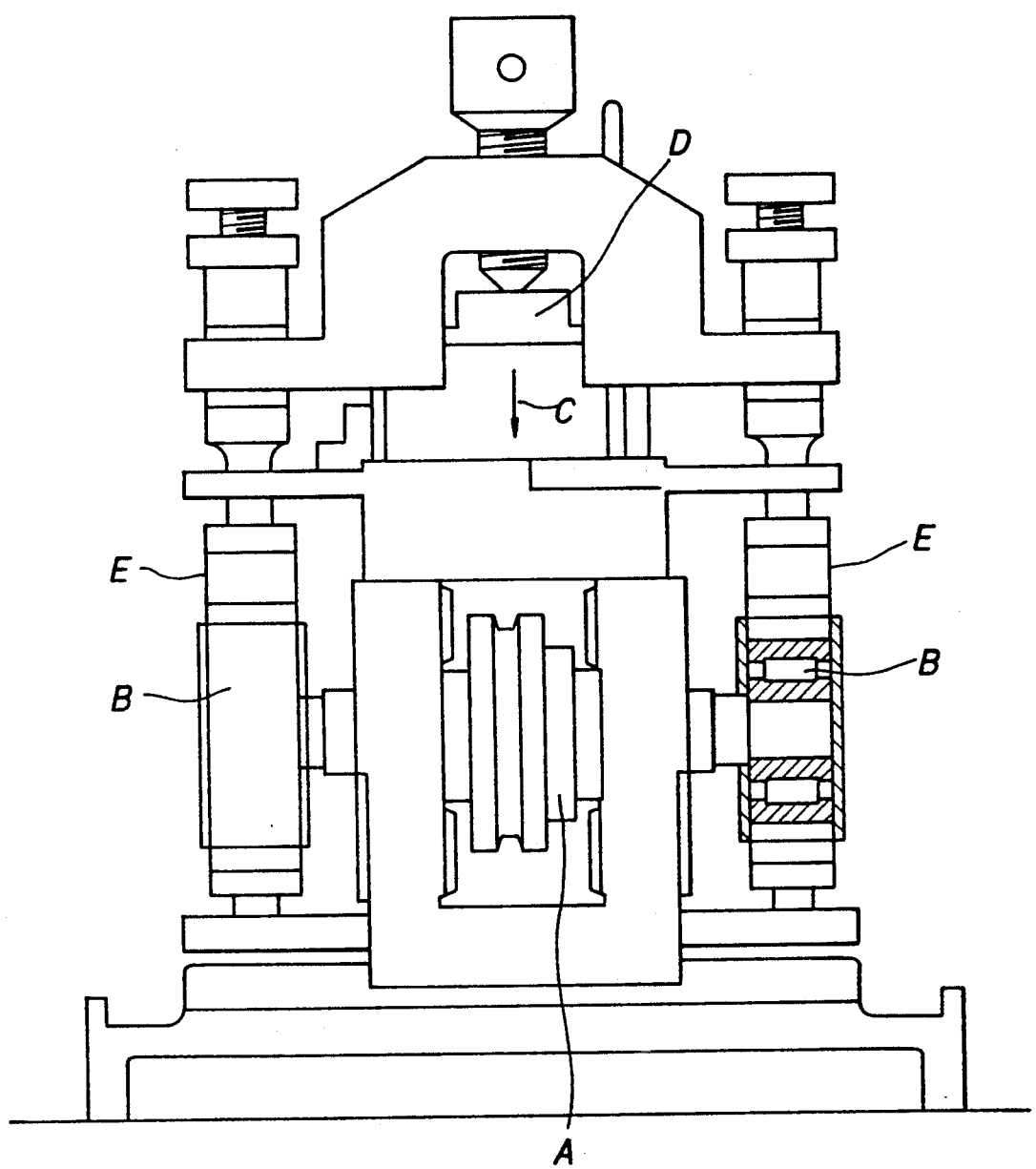
FIG. 3 is a front view of a conventional testing machine.

FIGS. 1 and 2 show an embodiment of this invention. A rotational main shaft 2 is journaled to a supporting frame 1. A mounting portion 4 for mounting a bearing 3 to be tested is fixedly projected integrally at an equal interval in a circumferential direction from outer peripheral portions of the rotational main shaft 2.

In the illustrated embodiment shown in FIGS. 1 and 2, the bearing 3 to be tested is a yoke type track roller bearing and includes an outer race member 7, an inner race member 27 and a needle cage 16. Particularly, an endurance of the needle cage 16 is tested.

The support frame 1 includes an outer ring 12 fixed thereto and a sun ring 9 fixed in the outer ring 12.

The rotational main shaft 2 includes the mounting portion 4 and a side plate 17. The mounting portion 4 includes a mounting shaft 5 for mounting the bearing 3 to be tested and a supporting bracket 6 for supporting the mounting shaft 5.

In the embodiment shown in FIGS. 1 and 2, three sets of mounting portions 4 are projected at an angular interval of 120° from the rotational main shaft 2. However, this invention is not limited to the three sets of the mounting portions 4 of the particular embodiment.

The respective mounting portions 4 are constructed in the same structure.

The mounting shaft 5 is selectively disposed at a position where a part of an outer peripheral surface 8 of the outer race member 7 of the bearing 3 to be tested is projected radially outwardly from the supporting bracket 6.

The sun ring 9 surrounds all the mounting portions 4 and is disposed concentrically with the rotational main shaft 2 in the supporting frame 1. An inner peripheral surface 10 of the sun ring 9 is used as a rolling track of the outer race members 7 of the respective bearings 3 to be tested. The outer race members 7 of the bearings 3 to be tested are rotated in contact with the inner peripheral surface 10 of the sun ring 9 when the rotational main shaft 2 is rotatably driven as will be described later.

An outer peripheral surface 11 of the sun ring 9 is formed in a spherical surface having a radius R at the center of the sun ring 9 as a center as illustrated in FIG. 2. An inner peripheral surface 13 of the outer ring 12 is brought into contact with an outer peripheral surface 11 of the sun ring 9, and is formed in a spherical surface having the radius R to hold the outer peripheral surface 11 of the sun ring 9.

The inner peripheral surfaces of the outer ring 12 at both sides of the inner peripheral surface 13 thereof in the embodiment shown in FIGS. 1 and 2 are formed in circumferentially flat cylindrical surfaces 14 and 15 in a structure in which the sun ring 9 can be detachably attached. The sun ring 9 is interference-fit into the outer ring 12.

The mounting shaft 5 is removed from the supporting bracket 6. After the bearing 3 to be tested is engaged with the mounting shaft 5, the mounting shaft 5 is mounted at the supporting bracket 6, a side plate 17 is further mounted to prevent the mounting shaft 5 from being removed, and the rotational main shaft 2 is rotatably driven by a driver (not shown) to perform an endurance test. Although the bearing 3 to be tested is supported at two parts in the illustrated embodiment, the bearing 3 may be supported at only one part.

Lubricating oil to be used at the time of the endurance test is supplied through an oil hole 18 in the rotational main shaft 2, an oil hole 19 in the supporting bracket 6 and oil holes 20, 21 in the mounting shaft 5.

According to the testing machine of this invention, the bearings 3 to be tested are rotated around the rotational main shaft 2 at a rotational frequency equal to that of the rotational main shaft 2 to rotate around the main shaft 2. The outer race members 7 are pressed in contact with the inner peripheral surface 10 of the sun ring 9 by means of centrifugal force and the outer race members 7 roll on the inner peripheral surface 10 of the sun ring 9 as a track by means of frictional force so that the bearings 3 to be tested are rotated around their own axes in rotational frequency much larger than that of the rotational main shaft 2.

Since the sun ring 9 is so arranged that the outer peripheral surface 11 thereof of the spherical surface is held by the inner peripheral surface 13 of the outer ring 12 of the spherical surface having the same radius as that of the outer peripheral surface 11 thereof, a centripetal action is always generated when the sun ring 9 is allowed to free-run by means of friction of the outer race members 7 upon rolling of the outer race members 7. Thus, the inner peripheral surface 10 of the sun ring 9 is brought into uniform contact with the outer race members 7 of the respective bearings 3 to be tested over the whole inner peripheral surface 10 of the sun ring 9.

The rotational main shaft 2 is removed from the supporting frame 1, the bearings 3 to be tested are respectively assembled at the supporting brackets 6 as described above, the brackets 6 assembled with the bearings 3 are engaged within the sun ring 9, side ring plate 22 is attached to prevent the bearings 3 to be tested from being removed from the sun ring 9, the sun ring 9 is then engaged within the outer ring 12 by utilizing the flat cylindrical surfaces 14 and 15 of the outer ring 12, the rotational main shaft 2 is journaled by the bearings 23 and 24 of the supporting frame 1, and the rotational main shaft 2 is then rotatably driven.

The first aspect of this invention as claimed in claim 1 is constructed and operated as described above, and the bearings to be tested are rotated around the rotational main shaft by the rotation of the main shaft, and are simultaneously rotated around their own axes along the inner peripheral surface of the sun ring since the outer race members thereof are brought into contact with the inner peripheral surface of the sun ring. The bearings to be tested are rotated around their own axes in higher rotational frequency than that of the rotational main shaft under the centrifugal load generated upon rotation of the bearings to be tested around the main shaft so as to perform an effect of executing an endurance test under the centrifugal load near the actual using condition of the combination of the rotation around the main shaft and the rotation around their own axes.

Since the mounting portions for mounting the bearings to be tested are formed integrally at an equal interval in a circumferential direction from the outer peripheral portions of the rotational main shaft, the balance of the bearings to be tested at the time of rotation is preferable to obtain stable test results when the testing machine is operated.

According to the second aspect of this invention as claimed in claim 2, the sun ring is always effected by a centripetal action to hold at its normal position. Therefore, the outer race members of the respective bearings to be tested can be brought into contact with the entire inner peripheral surface of the sun ring without deviation to be rotated. As a consequence, stable rest results are obtained.

What is claimed is:

1. A machine for testing a centrifugal load of a bearing including an outer race member, comprising:
 a supporting frame including a sun ring, and
 a rotational main shaft including mounting portions for mounting bearings to be tested, said mounting portions each including a mounting shaft for mounting a bearing to be tested and a supporting bracket for supporting said mounting shaft,
 said mounting portions being fixedly projected integrally from an outer peripheral portion of said rotational main shaft at equal intervals in a circumferential direction,
 each said mounting shaft being arranged in its respective said supporting bracket in parallel with the rotational main shaft in such a manner that a part of an outer peripheral surface of said outer race member is projected radially outwardly from said supporting bracket, said sun ring being concentrical with said rotational main shaft and surrounding said mounting portions, an inner peripheral surface of said sun ring being used as a track to be rolled with the outer race members of the bearings to be tested.

2. The machine for testing a centrifugal load of a bearing according to claim 1, wherein:

an outer peripheral surface of said sun ring has a spherical surface, an inner peripheral surface of an outer ring fixed to said supporting frame has a spherical surface having the same radius as that of the outer peripheral surface of said sun ring, and the outer peripheral surface of said sun ring is held by the inner peripheral surface of said outer ring.

* * * * *